US006312485B1

(12) United States Patent
Kaiser et al.

(10) Patent No.: US 6,312,485 B1

(45) Date of Patent: Nov. 6, 2001

(54) METHOD OF MANUFACTURING A FOAM BUFFING PAD OF STRING-LIKE MEMBERS

(75) Inventors: Richard A. Kaiser, Hartland; Scott S. McLain, Wind Lake; Jim D. Schneider, Pewaukee, all of WI (US)

(73) Assignee: Lake Country Manufacturing, Inc., Hartland, WI (US)

( * ) Notice: Subject to any disclaimer, the term of this patent is extended or adjusted under 35 U.S.C. 154(b) by 0 days.

(21) Appl. No.: 09/332,227

(22) Filed: Jun. 14, 1999

Related U.S. Application Data

(63) Continuation-in-part of application No. 09/063,670, filed on Apr. 21, 1998, now Pat. No. 6,001,009, which is a continuation-in-part of application No. 08/980,660, filed on Dec. 1, 1997, now Pat. No. 5,938,515.

(51) Int. Cl.[7] .............................. C09K 3/14; B24D 11/00

(52) U.S. Cl. ............................ 51/299; 451/527; 451/528; 451/532

(58) Field of Search ............................ 15/230.13, 230.14, 15/230.167; 51/299; 451/28, 527, 528, 532, 535, 536; 29/428, 432, 451, 453

(56) References Cited

U.S. PATENT DOCUMENTS

Re. 35,021 * 8/1995 Englund et al. .
D. 291,258 * 8/1987 Greer, Sr. .
2,214,351 * 9/1940 Schlegel .
2,347,244 * 4/1944 Colt et al. ........................ 451/527 X
2,690,661 * 10/1954 Briggs .
2,803,096 * 8/1957 Mockiewicz .
2,833,911 * 5/1958 Mahmarian .
3,252,775 * 5/1966 Tocci-Guilbert .
3,418,675 * 12/1968 Meguiar et al. .
3,727,353 * 4/1973 Pixley .
3,857,133 * 12/1974 Linenfelser .
4,055,029 * 10/1977 Kalbow .
4,111,666 * 9/1978 Kalbow .
4,407,040 * 10/1983 Scharf .
4,485,919 * 12/1984 Sandel .
4,523,411 * 6/1985 Freerks .
5,007,128 * 4/1991 Englund et al. .
5,016,401 * 5/1991 Mangus et al. .................. 451/527 X
5,020,283 * 6/1991 Tuttle .
5,185,964 * 2/1993 Englung et al. .
5,312,197 * 5/1994 Abramson .
5,389,032 * 2/1995 Beardsley .
5,396,737 * 3/1995 Englund et al. .
5,525,100 * 6/1996 Kelly et al. .......................... 451/527
5,527,215 6/1996 Rubino et al. .
5,679,067 * 10/1997 Johnson et al. ...................... 451/527
5,771,525 * 6/1998 Fulcher et al. .

* cited by examiner

*Primary Examiner*—Timothy V. Eley
(74) *Attorney, Agent, or Firm*—Andrus, Sceales, Starke & Sawall

(57) ABSTRACT

A polymeric foam finishing pad is made by attaching an array of foam fingers to a suitable support substrate. The foam fingers are attached to the substrate in a continuous strip of interconnected fingers or may be individually inserted into a support substrate and attached to the substrate by an adhesive layer. Each of the foam members is preferably formed in and cut from an advancing foam strip and folded and inserted into a preformed opening contained in the support substrate, such that each foam member forms a pair of fingers that extend from the front face of the support substrate. The outer tip of each foam finger may include a pair of slits extending into the foam member from the outer tip to divide each outer tip into a plurality of contact tips, thereby increasing the amount of surface contact between the finishing pad and the surface being finished. The tips of the fingers may also be provided with abrasive particles to provide a more aggressive pad finishing surface.

16 Claims, 8 Drawing Sheets

FIG. 8
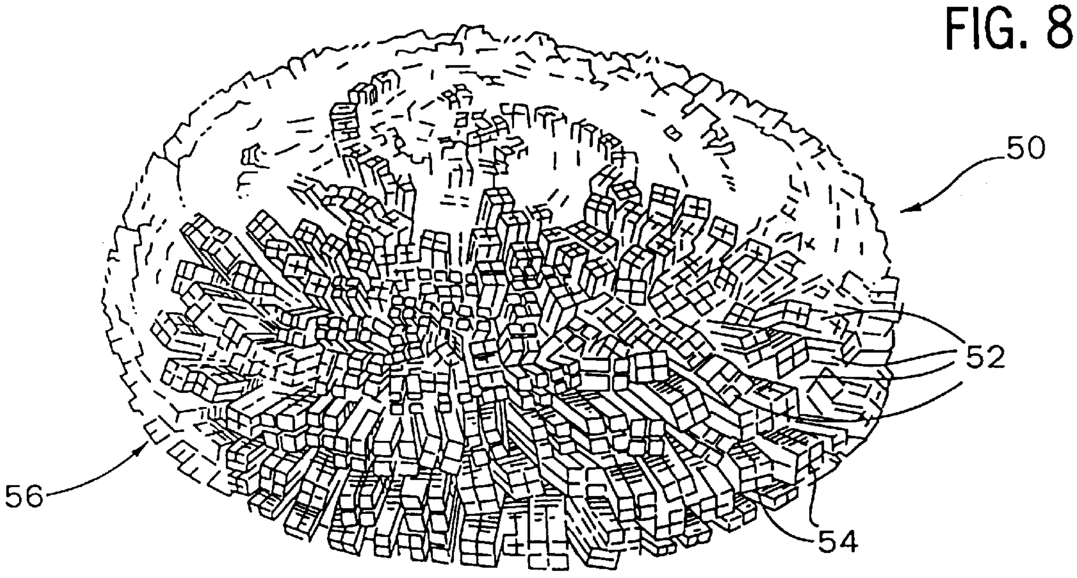
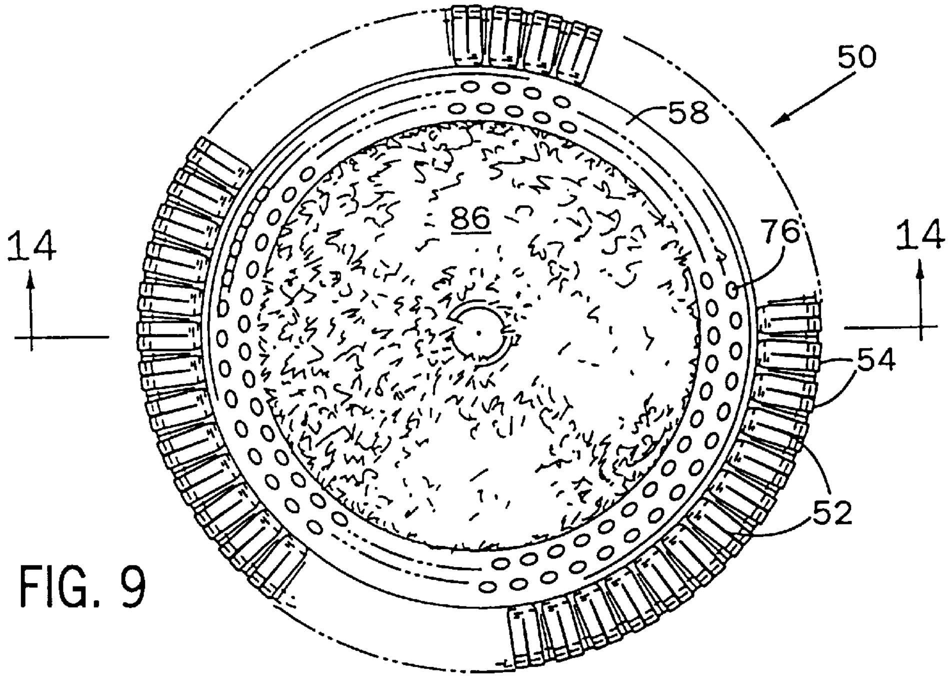
FIG. 9
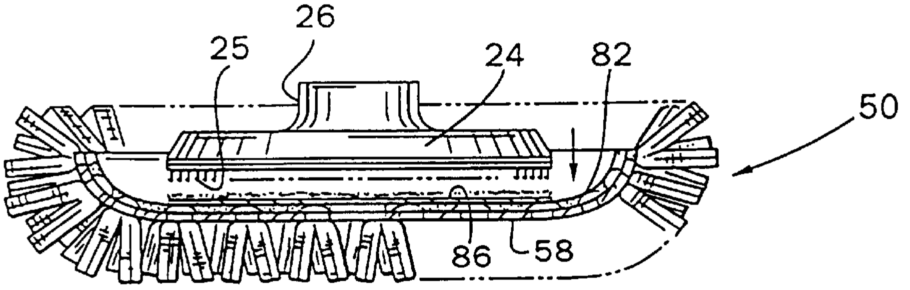
FIG. 10

FIG. 12A
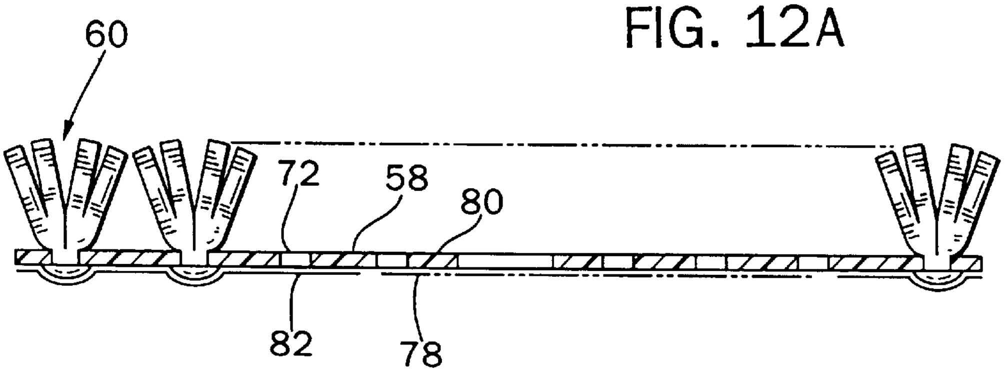
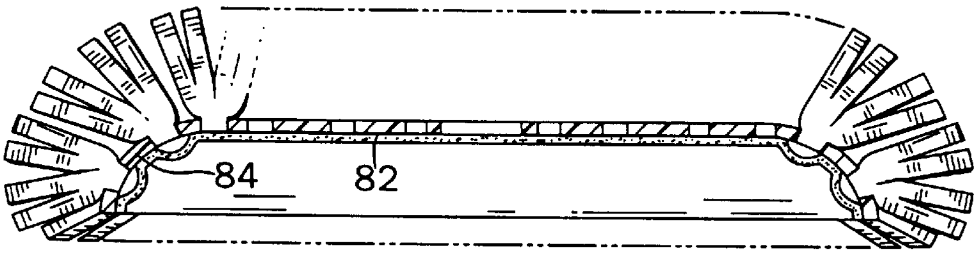
FIG. 12B
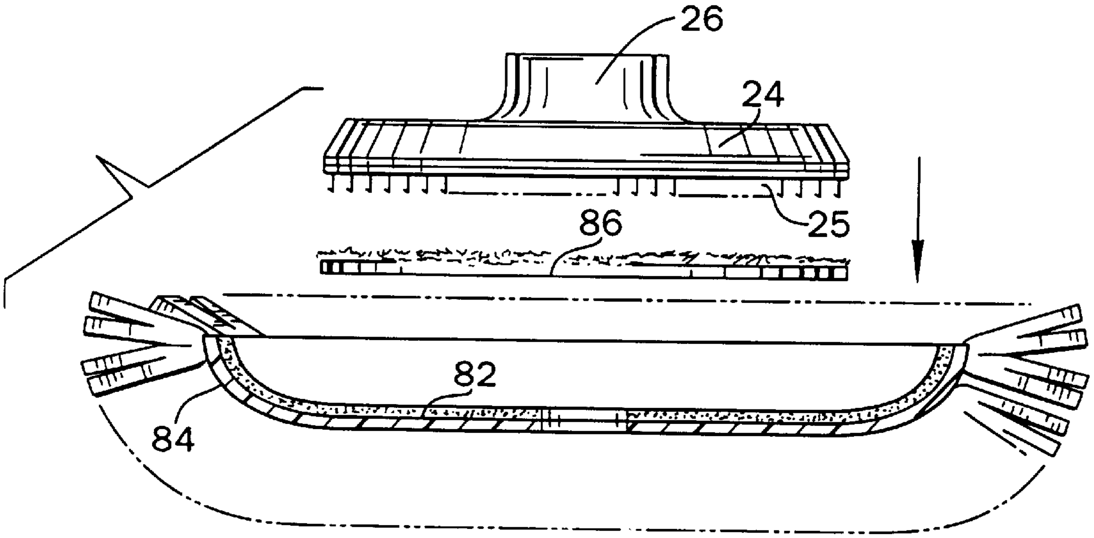
FIG. 12C

METHOD OF MANUFACTURING A FOAM BUFFING PAD OF STRING-LIKE MEMBERS

The present application is a continuation-in-part of patent application Ser. No. 09/063,670, filed on Apr. 21, 1998 now U.S. Pat. No. 6,001,009, which is a continuation-in-part of patent application Ser. No. 08/980,660, filed on Dec. 1, 1997 now U.S. Pat. No. 5,938,515.

BACKGROUND OF THE INVENTION

The present invention pertains to the field of foam buffing and pads. More specifically, the invention is a rotary pad made from foam string material for buffing and polishing painted or similarly finished surfaces.

Foam buffing pads are now used in many buffing and polishing operations where synthetic or natural fiber pads, such as tufted wool pads, had previously been used. In particular, open cell polyurethane foam pads, with both reticulated and non-reticulated cell structures, have become particularly popular. However, despite certain advantages of polymer foam pads over fibrous and tufted pads, there are still a number of inherent disadvantages attendant the use of foam pads. These disadvantages include the "chatter" or jumping of the pad by excess frictional surface contact between flat working surface portions of the pad and the surface of the work being finished; splattering of the polish or other finishing compound as a result of the compound being thrown radially outwardly by centrifugal force; and, burning of the surface of the work being finished by the high speed outer edge portions of the rotary pad.

Attempts have been made to minimize or eliminate these problems by varying the type and density of foam used and by changing the working surface of the pads. Initially, foam pads were made of a generally cylindrical disc with a flat planar working face and, typically, with a radiused outer edge providing the transition between the working face and the outer cylindrical edge face. However, flat pads are particularly subject to chatter and provide little deterrent to the splatter of polish. Flat faced pads also give the operator little control over variations in the working surface actually in contact with the work surface being finished or polished. One attempt at solving the problems presented by flat foam buffing pads was the introduction of buffing pads having working surfaces with a convoluted or waffle shape. One such pad was previously made by Lake Country Manufacturing, Inc. Although this pad provided variable working surface contact by varying operator-applied pressure, surface contact was somewhat difficult to control and the pad did little to prevent splatter. A different approach to solving the prior art problem is shown in U.S. Pat. No. 5,527,215 where a cylindrical foam pad has a recessed center portion or portions within which the polishing compound may be trapped against radial splatter. This pad also provides the ability the alter the working surface contact by varying operator-applied pressure. However, neither of the foregoing pads adequately solves all of the prior art problems.

One recent attempt to solve the remaining problems inherent in foam buffing pads has resulted in the introduction of a pad having a working face comprising a concave central contact surface which increases radially inwardly with increasing pad compression by the operator. This pad has helped reduce chatter and improved operator control of the working surface contact area.

However, all of the foregoing foam pads are characterized by their monolithic body construction in which the foam bodies are made of a single uniform layer of foam material and, as a result, have an uninterrupted working face regardless of variations in face contour. As a result, monolithic polymeric foam pads remain subject to pad chatter, relatively rapid working surface contamination, undesirable swirl marks, and susceptibility to tearing out of large pieces of the foam body as a result of contact with obstructions during finishing operation.

Therefore, foam buffing and finishing pads have never completely replaced pads made with tufted wool fibers or other natural or synthetic fibers. U.S. Pat. No. 2,690,661 shows an attempt to provide a hybrid pad comprising a tufted construction of cotton strands to which an outer layer of cellulose material is intimately bonded. If a pad of this construction was ever commercialized, its use today is not known.

SUMMARY OF THE INVENTION

In accordance with the present invention, a surface finishing pad and its method of manufacture are provided which combine all of the best features of foam pads and tufted pads and, as a result, provide a pad capable of providing a superior finish, substantially extended wear life, superior performance, and substantially extended service time between cleanings.

In a preferred embodiment of the invention, a surface finishing pad includes a support substrate and a plurality of fingers of polymeric foam material with the fingers having outer tips which define a pad finishing surface. The fingers may be joined to the support substrate in one of several manners. In the presently preferred embodiment for use as a rotary finishing pad, the support substrate is circular. Preferably, the support substrate is formed from a plastic material having a plurality of openings.

The polymeric foam material preferably comprises polyurethane. More preferably, the material is an open cell polyurethane which may or may not be reticulated. The outer tips of the fingers may be loaded with an abrasive material, such as abrasive particles. The abrasive particles may be adhesively attached to the fingers or may be incorporated directly into the foam material.

In a presently preferred embodiment of the subject invention, a surface finishing pad comprises a support substrate and a plurality of individual fingers of polymeric foam disposed i the support substrate. Each of the foam fingers has an attachment portion that extends through the substrate and is affixed to the back face of the support substrate. Each of the fingers includes an outer tip that extends from a front face of the support substrate, such that the outer tips of the fingers define the pad finishing surface. Preferably, the surface finishing pad is formed from a plurality of individual foam members that are disposed in a dense array on the support substrate.

Each of the foam members includes a first outer tip and a second outer tip. The foam member is folded along an attachment portion positioned between the first and second outer tips. The attachment portion of each foam member is pressed through the support substrate such that the attachment portion of the foam member extends from the back face of the support substrate. In the preferred embodiment of the invention, the attachment portion is adhesively attached to the back face of the support substrate.

In a preferred embodiment, each of the first and second outer tips of the foam member includes a pair of slits extending into the body of the foam member from the respective outer tip. The pair of slits divide each of the outer tips into four contact tips, thereby increasing the amount of surface contact between the surface finishing pad and the painted surface to be finished.

One embodiment of a method for manufacturing a surface finishing pad, in accordance with the present invention, includes the steps of (1) providing a support substrate having a front face and a back face, (2) forming a plurality of individual foam members each having a first outer tip and a second outer tip, (3) folding each of the foam members to form an attachment portion between the first and second outer tips, (4) pushing the attachment portion of each foam member through an opening in the support substrate, and (5) securing the attachment portion to the back face of the support substrate. The foam members may be attached to the support substrate by an adhesive layer, a series of staples, the friction fit between the foam members and the support substrate, or an equivalent method.

Additionally, the method of manufacturing the surface finishing pad can include the step of slitting the outer tip of each foam finger along a pair of orthogonally disposed slit lines. After each outer tip has been slit, each outer tip will include a plurality of contact tips that can be used in surface finishing.

In accordance with a particularly preferred method of manufacturing a surface finishing pad, the steps include (1) providing a continuous strip of polymeric foam material having parallel planar top and bottom surfaces that extend between narrower opposite lateral edges; (2) separating individual elongate foam members successively from a leading edge of the strip, each of the members having opposite end tips; (3) providing a supporting substrate having generally planar front and rear faces and a selected pattern of openings formed therethrough; (4) folding each of the foam members to form an attachment portion between the end tips and to divide the member into first and second foam fingers; and (5) pushing the attachment portion of each foam member through an opening in the substrate such that the attachment portion extends from the rear face of the substrate and the first and second foam fingers extend from the front face of the substrate with the end tips defining a pad finishing face. The method may also include, before the separating step, the step of applying a mixture of abrasive particles and a liquid adhesive to the end tips.

A slightly modified method includes the steps of (1) partially cutting the continuous strip of polymeric foam inwardly from the lateral edges to provide a longitudinally extending row of laterally elongate foam members, each of which has opposite end tips between an uncut attachment portion; (2) separating individual elongate foam members from the strip; and (3) pushing the attachment portion of each foam member through a support member having front and rear faces, such that the attachment portion extends from the rear face and the foam member is divided into two fingers extending from the front face, with the end tips defining a pad finishing face.

The method may also include the steps of (1) cutting the strip of foam horizontally along both lateral edges between the top and bottom surfaces; and (2) cutting each end tip on the strip vertically, whereby each of the fingers includes four tips.

The method may also include the steps of (1) displacing the fingers from the planes of the respective top and bottom surfaces of the foam strip to expose the end tips; and (2) applying a mixture of abrasive particles and liquid adhesive to the exposed end tips.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 8 is a top perspective view of a surface finishing pad of the present invention made in accordance with the method of the preferred embodiment.

FIG. 9 is a bottom plan view of the finishing pad shown in FIG. 8.

FIG. 10 is a vertical section taken on line 10—10 of FIG. 9 and additionally showing a backing plate.

FIG. 12A is a side elevation view of the support substrate and the individual foam members inserted therethrough.

FIG. 12B is an inside view of the finishing pad shown in FIG. 12A as molded in accordance with the preferred embodiment of the invention.

FIG. 12C is an exploded side view of the finishing pad and backing plate.

DETAILED DESCRIPTION OF THE INVENTION

Figure 1:
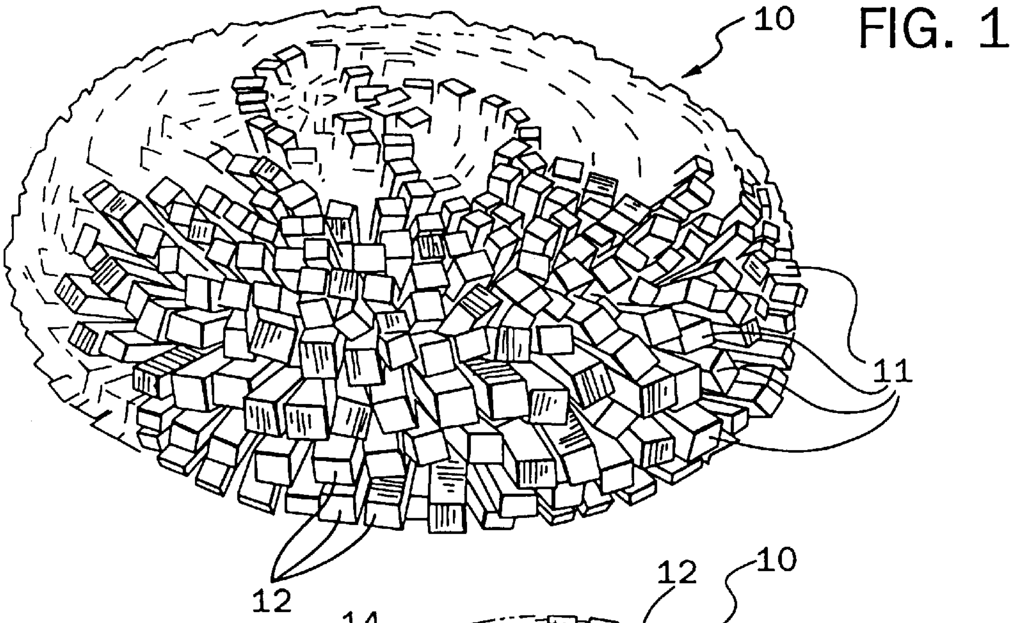
FIG. 1 is a top perspective view of a surface finishing pad of the present invention made in accordance with the method of a first embodiment.
Figure 2:
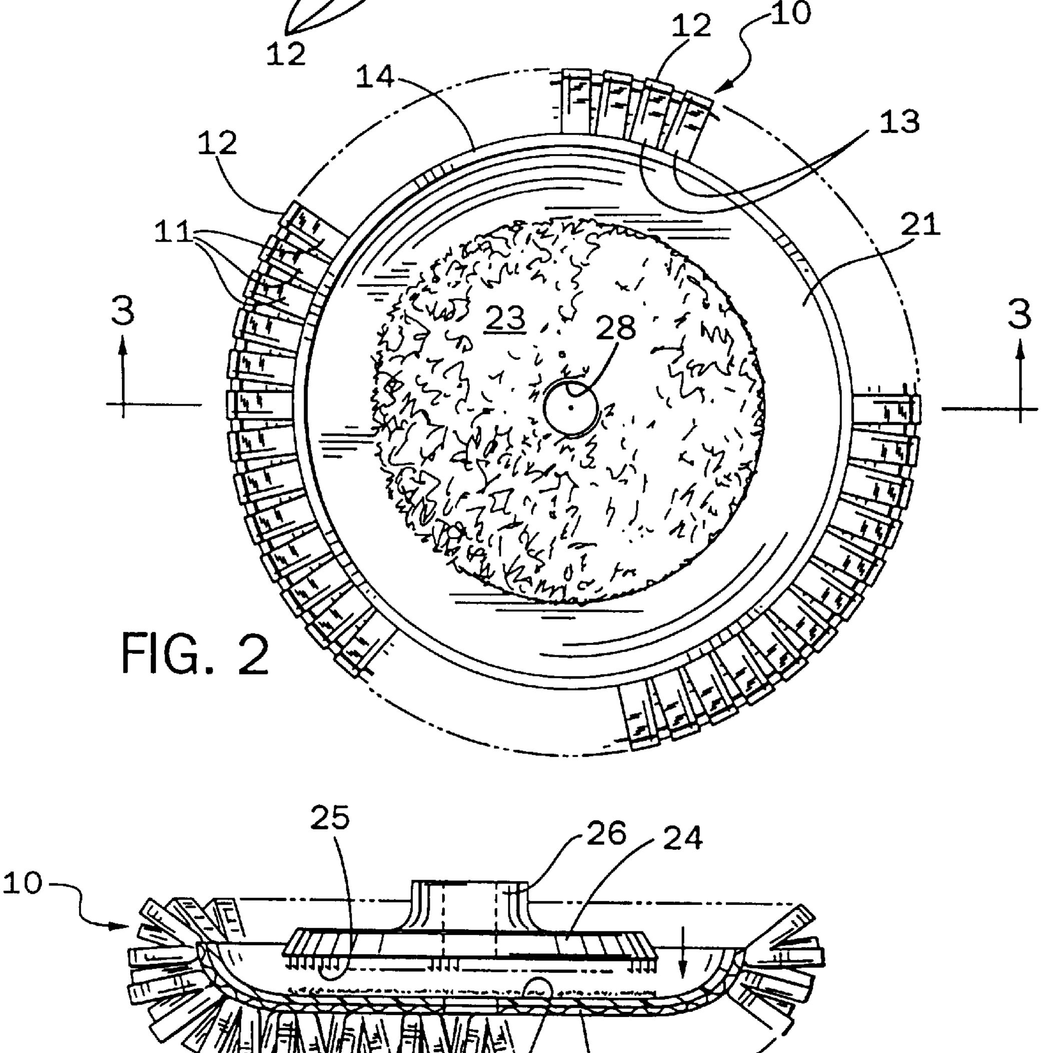
FIG. 2 is a bottom plan view of the finishing pad shown in FIG. 1.

FIG. 1 shows a polymeric foam pad 10 adapted to be used as a buffing or surface finishing pad, such as for automotive paint surface finishing. The pad is comprised of a large number of relatively closely packed foam fingers 11, the individual outer tips 12 of which form the primary active finishing surface of the pad. The base ends 13 of the fingers 11 are attached to a pad substrate 14, as may be seen in the backside view in FIG. 2. The fingers 11 may be formed and attached to the substrate 14 in a number of different ways, as will be described hereinafter. The polymeric foam material is typical of that commonly used in paint finishing pads and may comprise, for example, an open cell polyurethane which may be reticulated or unreticulated. A characteristic difference between finishing pads of the present invention and pads of the prior art is that the pads of this invention are not in the form of a single monolithic layer of foam, but rather are comprised of a dense array of individual fingers.

Figure 3:
FIG. 3 is a vertical section taken on line 3—3 of FIG. 2 and additionally showing a backing plate.

Finishing pads of the subject invention may be made of either curved or flat construction, both of which are well known in the art. A curved pad is one in which the substrate is formed with a curved outer edge so that the foam wraps around and forms a laterally projecting peripheral buffing or finishing surface, such as shown in FIG. 3. As the name suggests, flat pads simply have a flat substrate, although the surface of the foam pad may be suitably contoured as desired.

Figure 5A:
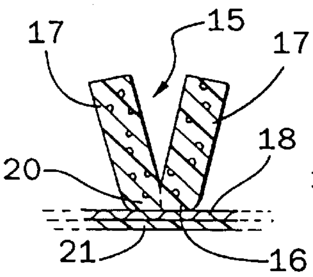
FIGS. 5A and 5B are sectional details showing alternate attachment mechanisms for the polymeric foam strip used to make pads of the present invention.
Figure 6A:
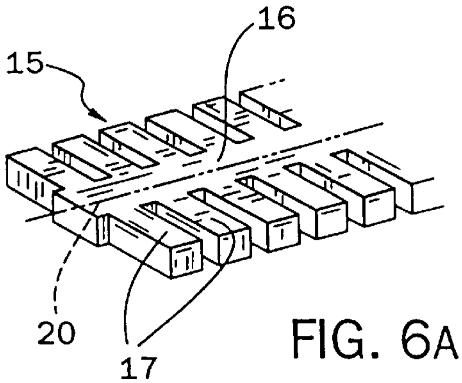
FIG. 6A is a perspective view of a section of the polymeric foam strip of FIGS. 5A and 5B.
Figure 6B:
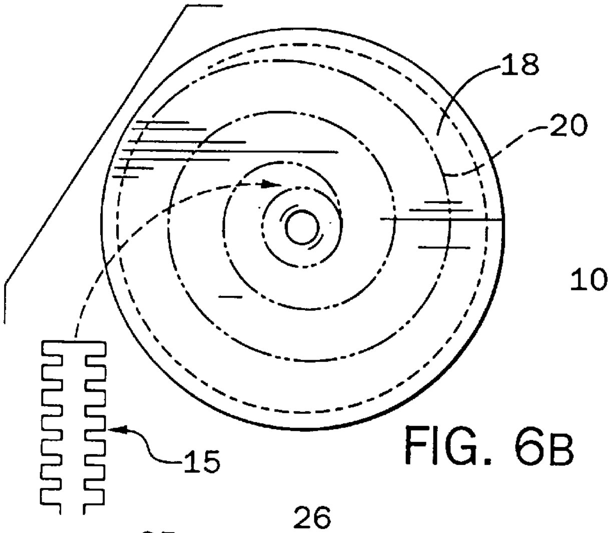
FIGS. 6B–6E are generally schematic representations of the method for making the finishing pad shown in FIGS. 1–3.
Figure 6C:
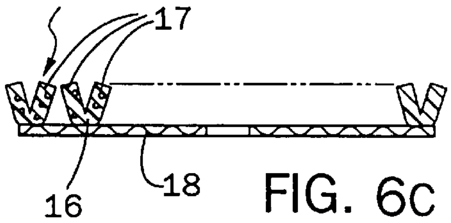

The pad shown in section in FIG. 3 may be manufactured in accordance with a first method which will be described with respect to FIGS. 6A–6E. A long continuous strip 15 of a suitable foam material is formed, as for example in a rotary die cutter, with an elongate body 16 and a series of integral laterally projecting and longitudinally spaced fingers 17. The strip 15 is sewn to a fabric substrate 18 which, conveniently, may comprise a conventional burlap or jute backing commonly used in the manufacture of tufted wool buffing pads. The strip 15 is sewn to the substrate 18 on a spiral stitch line 20 which extends longitudinally along the body 16 of the strip. The compression of the body 16 along the stitch line 20 causes the fingers 17 to turn upwardly, as shown in FIGS. 5A and 6C. Conveniently, stitching may commence at the radial outer edge of the substrate and spiral inwardly to the end of the strip 15 near the center of the substrate, as may best be seen with reference to FIG. 6B.

Figure 6D:
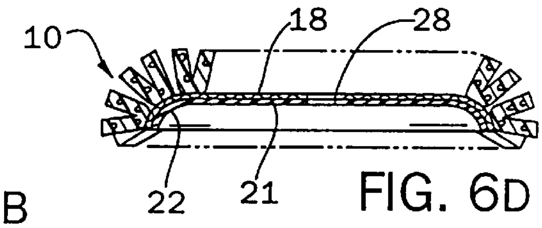
Figure 6E:
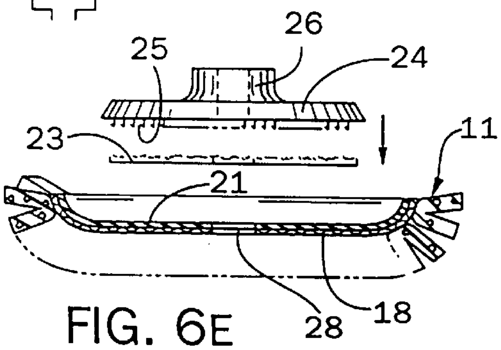

The flat fabric substrate 18 having the foam strip 15 sewn thereto, as shown in FIG. 6C, may then be processed in a number of different ways to provide the unique foam fingered pad of the present invention. Referring also to FIGS. 6D and 6E, the substrate 18 may be curved by heat forming the back face of the substrate to a plastic backing 21 in a suitably shaped mold to provide an upturned peripheral edge 22 on the pad. In addition to the use of a woven natural fiber for the substrate 18, the substrate may also be made from woven synthetic fibers, woven fibers (either natural or synthetic) which are impregnated with a plastic, or solid plastic.

Figure 4:
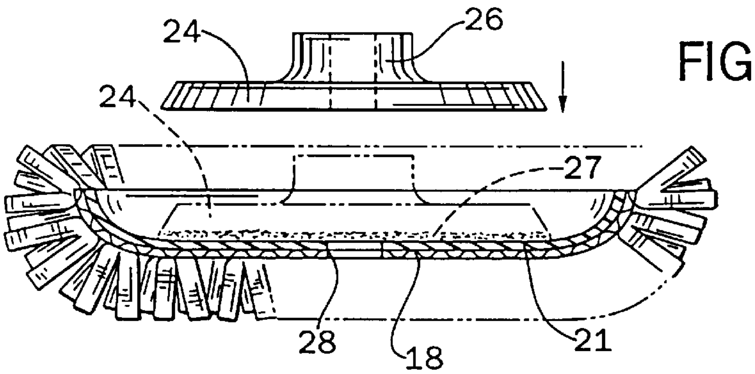
FIG. 4 is a view similar to FIG. 3 showing an alternate backing plate attachment.

The pad 10 may then be mounted on a buffing machine in any of several alternate ways. As shown in FIG. 6E and in FIG. 3, a sheet 23 of loop material, for a conventional hook and loop type fastening system, may be bonded or otherwise adhesively attached to the exposed face of the plastic backing 21. The loop material sheet 23 then cooperates with a conventional backing plate 24 to the face of which is attached a sheet 25 of hook material to cooperate with the loop material sheet 23 in a known manner. The backing plate 24 includes a central hub 26 which is internally threaded for attachment to the rotary stub shaft of a conventional buffing machine (not shown). Alternately, as shown in FIG. 4, the backing plate 24 may be bonded directly to the plastic backing 21 with a suitable adhesive layer 27. In a further alternate means for mounting, the fabric substrate and plastic backing 21 may be provided with a central hole 28 for receipt of the rotary buffing machine shaft for direct bolted mounting thereto, using a nut and washer (not shown) attached from the front face of the pad 10.

Figure 5B:
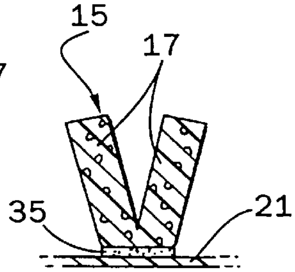

In FIG. 5B, an alternate means for attaching the foam strip 15 to a substrate is shown. By adhesively bonding the body 16 of the strip directly to a rigid plastic backing, as with a glue line 35, an intermediate fabric substrate may be eliminated. In lieu of a glued connection, alternate methods of attaching the foam strip to the plastic backing 21 may include sonic welding or solvent bonding.

Figure 7:
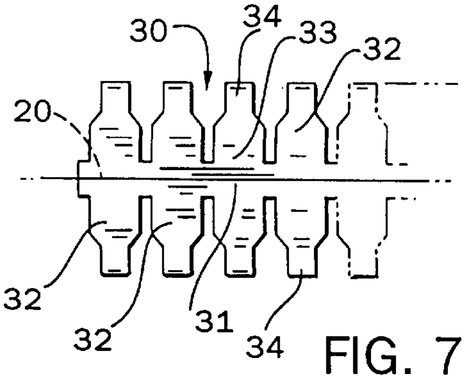
FIG. 7 is a top plan view of an alternate form of the polymeric foam strip used in making finishing pads of the subject invention.

As shown in FIG. 7, an alternate foam strip 30 includes a similar elongate body 31 running the full length of the strip, as in strip 15 of the previously described embodiment. The fingers 32, however, are formed somewhat differently, having a stepped configuration with wider base portions integrally attached to the body 31 and narrower outer ends 34 which define the working tips in the completed pad, as described above. The finishing pad of the present invention lends itself to use of a wide range of sizes and shapes of foam strips which may be readily custom cut for a particular application.

Referring now to FIGS. 8–10, thereshown is a preferred embodiment of a polymeric foam pad 50 adapted to be used as a buffing or surface finishing pad, such as for automotive paint surface finishing. As with the previously described embodiments, the pad 50 is comprised of a large number of relatively closely packed foam fingers 52. Each of the individual foam fingers 52 includes an outer tip 54. The plurality of outer tips 54 combine to form a pad finishing surface 56 for the foam pad 50. Each of the foam fingers 52 is attached to a support substrate 58, as may be seen in the backside view in FIG. 9. The foam fingers 52 may be formed and attached to the support substrate 58 in a number of different ways, as will be described hereinafter. The polymeric foam material used to construct each of the foam fingers 52 is typically of that commonly used in paint finishing pads and may comprise, for example, an open cell polyurethane which may be reticulated or unreticulated.

As with the previous embodiments, the foam pad 50 of the preferred embodiment may be made of either curved or flat construction, both of which are well known in the art. A curved foam pad is one in which the support substrate is formed with a curved outer edge so that the foam wraps around and forms a laterally projecting peripheral buffing or finishing surface, such as shown in FIG. 10. As the name suggests, flat pads simply have a flat support substrate, although the surface of the foam pad may be suitably contoured as desired.

Figure 11A:
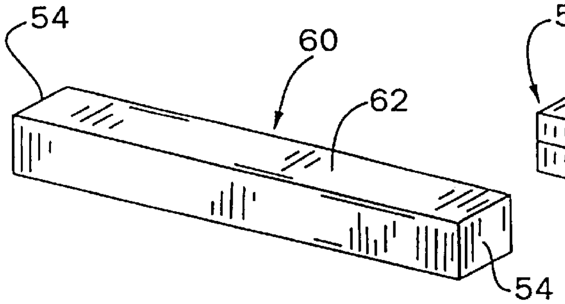
FIG. 11A is a perspective view of an individual foam member used to make the pads of the present invention.

The foam pad 50 shown in section in FIG. 10 may be manufactured in accordance with one presently preferred method that will be described with respect to FIGS. 11A–11F. Initially, a plurality of individual foam members 60 of a suitable foam material are formed in the shape as shown in FIG. 11A. Each of the foam members 60 includes an elongated body 62 and a pair of outer tips 54. In the preferred embodiment of the invention, each of the foam members 62 has a generally rectangular profile, although other profiles could be used while operating within the scope of the present invention.

Figure 11B:
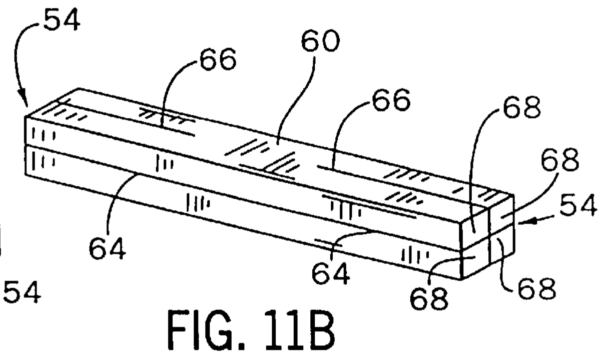
FIG. 11B is a perspective view of the foam member shown in FIG. 11A, further including a series of slits formed in accordance with the method of the preferred embodiment.

In a preferred embodiment of the invention, a first slit 64 and a second slit 66 are formed in each end of the foam member 60, such that each of the slits 64 and 66 extend longitudinally from one of the respective outer tips 54, as shown in FIG. 11B. As can be seen in FIG. 11B, the first slit 64 and the second slit 66 are orthogonally disposed with respect to each other such that the first slit 64 and the second slit 66 form a plurality of contact tips 68 along each of the outer tips 54. By dividing each outer tip 54 into a plurality of contact tips 64, the amount of contact between the foam pad 50 and the surface being finished is increased to provide more effective finishing. Each of the first and second slits 64, 66 extend inward from one of the outer tips 54 and terminates at a point spaced from the center of the foam member 60. Although the preferred embodiment is described as including the first slit 64 and the second slit 66, it should be understood that the foam pad 50 of the present invention could be constructed in an identical manner as described below without the inclusion of the first slit 64 and the second slit 66.

Figure 11C:
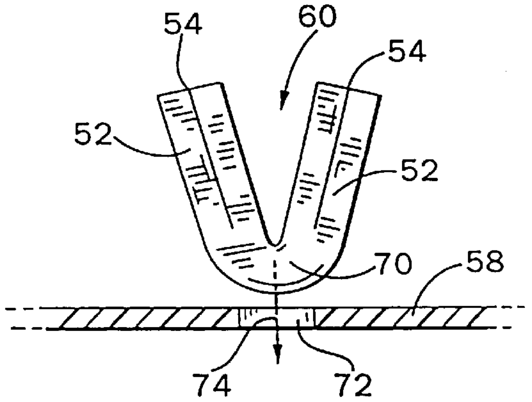
FIGS. 11C and 11D are sectional details illustrating the method of inserting each individual foam member into the backing member.

After the foam member 60 has been formed as shown in FIG. 11B, the foam member 60 is folded generally in half to form a folded portion 70, as shown in FIG. 11C. When the foam member 60 has been folded as shown in FIG. 11C, the foam member 60 forms a pair of foam fingers 52. Each of the foam fingers 52 generally extends from one of the outer tips 54 to the folded portion 70.

Figure 11D:
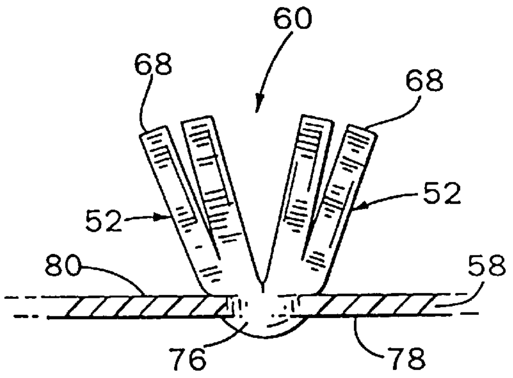
Figure 11E:
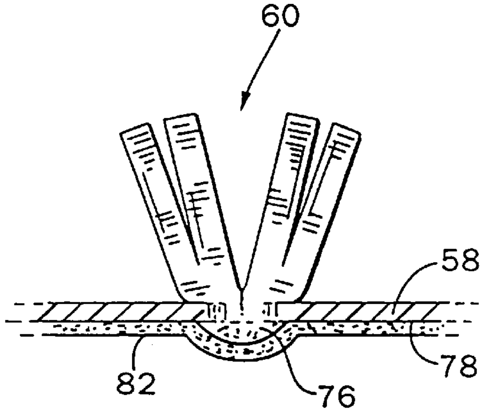
FIG. 11E is a sectional detail showing the securing method for the foam member of the present invention.
Figure 11F:
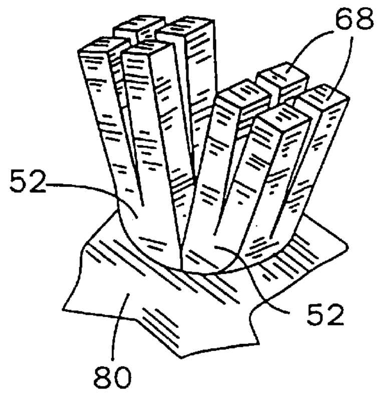
FIG. 11F is a detailed perspective view of the foam member as inserted through the support substrate.

After the foam member 60 has been folded as described, the foam member 60 is pressed through an opening 72 formed in the support substrate 58, as shown by arrow 74. In the preferred embodiment of the invention, each of the foam members 60 is pressed through the support substrate 58 using a modified brush filling method and machine in a manner similar to the formation of a tufted wool buffing pad. After the foam member 60 has been pressed through the opening 72, as shown in FIG. 11D, an attachment portion 76 of the foam member 60 extends from a back face 78 of the support substrate 58. In the preferred embodiment of the invention, each of the openings 72 formed in the support substrate 58 is sized slightly smaller than the folded portion 70 of the foam member 60, such that the compression of the folded portion 70 when pressed through the opening 72 causes each of the foam fingers 52 to turn upwardly, as shown in FIG. 11D. Additionally, the compression of the foam member 60 causes each of the plurality of contact tips 68 to separate, as best shown in FIGS. 11D and 11F. Positive separation of the contact tips 68 aids in increasing the amount of contact between each of the fingers 52 and the surface being finished.

In the preferred embodiment of the invention, the support substrate 58 is formed from a plastic material having openings 72 preformed therein in a pattern as can be partially seen in FIG. 9. Alternatively, the opening 72 may be formed by a punch included on the brush filling machine, such that the openings 72 would be formed just before the foam members 60 are pressed through the openings 72 by the brush filling machine. Additionally, the support substrate 58 could be formed from a fabric material similar to that used in tufted wool buffing pads and the foam members 60 pressed therethrough without the requirement of preformed holes.

After each of the foam members 60 has been folded and pressed through one of the openings 72, each of the foam members 60 forms a pair of foam fingers 52. Each of the foam fingers 52 extends from a front face 80 of the support substrate 58. Thus, the outer tip 54 of each foam member 60, which is divided into four contact tips 68 in the preferred embodiment, forms the pad finishing surface 56 for the foam pad 50.

Once the plurality of foam members 60 have been inserted into the plurality of openings 72 contained in the support substrate 58 in a dense array, the attachment portion 76 of each foam member 60 is secured to the back face 78 of the support substrate 58. In the preferred embodiment of the invention, a layer of adhesive 82 is formed along the entire back face 78 of the support substrate 58, as shown in FIG. 11E. The adhesive layer 82 securely bonds the attachment portion 76 of each foam member 60 to the support substrate 58. After the adhesive layer 82 has been formed, the completed foam pad 50 includes the securely attached foam fingers 52 extending from the front face 80 of the support substrate 58, as is best shown in FIG. 11F.

In a contemplated alternate embodiment, the attachment portion 76 of each foam member 60 could be secured to the support substrate 58 by a mechanical attachment means, such as a conventional staple. Alternatively, each of the foam members 60 could remain secured to the support substrate 58 by only the friction fit between the attachment portion 76 and the opening 72 through which it is pressed. In a surface finishing pad constructed without the use of a separate attachment means, the size of the openings 72 in the support substrate 58 could be decreased to increase the strength of the friction fit between the foam member 60 and the support substrate 58.

Although the foam pad 50 of the present invention has been described as being formed by a plurality of foam members 60 folded generally in half and inserted into the support substrate 58 to define a pair of foam fingers 52, in an alternate embodiment the length of the foam member 60 could be shortened and one of the outer tips 54 pressed through an opening in the support substrate 58. With one of the outer tips 54 pressed through one of the openings 72, the adhesive layer 82 would then hold the outer tip 54 to the back face 78 of the support substrate 58. In this manner, each of the foam members 60 would define only one foam finger 52, rather than the pair of foam fingers 52 described above.

The flat support substrate 58 having the plurality of foam members 60 adhered thereto, as shown in FIG. 12A, may then be processed in a number of different ways to provide the unique foam fingered pad 50 of the present invention. Referring also to FIGS. 12B and 12C, since the support substrate 58 is preferably formed from a plastic material, the support substrate 58 may be curved by heat forming in a suitably shaped mold to provide an upturned peripheral edge 84 on the pad 50. Alternatively, if a woven natural fiber is utilized for the support substrate 58, the substrate may be curved by heat forming the substrate to a plastic backing (not shown) and subsequently the plastic backing may be heat molded as described above.

The foam pad 50 may then be mounted on a buffing machine in any of several alternative ways. As shown in FIGS. 10 and 12C, a sheet 86 of loop material, for a conventional hook and loop-type fastening system, may be bonded or otherwise adhesively attached to the adhesive layer 82. The loop material sheet 86 then cooperates with the conventional backing plate 24 to the face of which is attached the sheet 25 of hook material to cooperate with the loop material sheet 86 in a known manner. The backing plate 24 includes the central hub 26 which is integrally threaded for attachment to the rotary stub shaft of a conventional buffing machine (not shown). Alternatively, the backing plate 24 may be bonded directly to the adhesive layer 82 with a suitable layer of adhesive.

The foam fingers of any of the pad embodiments described above may have abrasive particles embedded therein or attached thereto to provide a more aggressive finishing pad. The abrasive particles may be attached to the tips of the fingers by an adhesive or some other bonding process, or the abrasive particles may be incorporated directly into the foam material when it is manufactured. One such embodiment will be described below.

Figure 14:
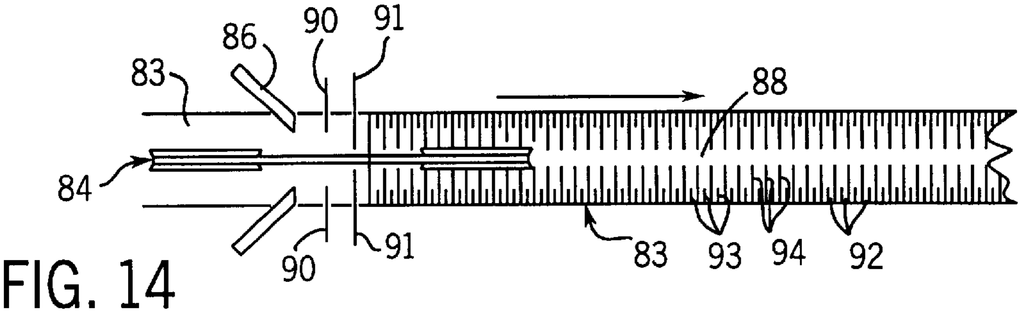
FIG. 14 is a top plan view of the apparatus shown in FIG. 13.
Figure 13:
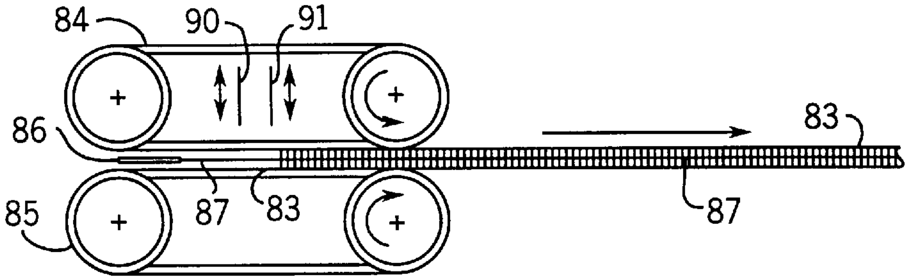
FIG. 13 is a generally schematic side elevation view of an apparatus for forming individual foam members from a continuous strip of polymeric foam material.

FIGS. 13 and 14 show in a generally schematic representation an apparatus for preforming the foam fingers 52 used in making the foam finishing pad 50 of the preferred embodiment of FIG. 8. A continuous foam strip 83, made for example of reticulated open cell polyurethane, is moved horizontally between upper and lower indexing belts 84 and 85. The belts capture the foam strip 83 and move it longitudinally in a controlled incremental manner. As the strip is moved longitudinally, a pair of horizontal cutting knives 86, disposed on opposite sides of the strip, provide continuous longitudinal cut lines 87 along the opposite edges of the strip. The cut lines 87 are disposed centrally along the edge and extend inwardly from each edge leaving an uncut center portion.

Downstream of the horizontal cutting knives 86 are laterally disposed pairs of first vertical cutting knives 90 and second vertical cutting knives 91. Both pairs of knives 90 and 91 operate in vertical reciprocating fashion to slit through the foam strip 83. The drive for the indexing belts 84 and 85 operates to halt the longitudinal movement of the foam strip to index it to the proper position for each vertical stroke of the knife pairs 90 and 91.

The first vertical cutting knives 90 slit the foam strip 83 inwardly the same lateral distance as the horizontal cutting knives 86. The second vertical cutting knives slit the strip laterally inwardly by a greater amount, but leave narrow center connecting portions 88. At this point, the strip comprises a longitudinally extending row of laterally elongate foam members 92, each of which is subsequently serially cut from the end of the advancing strip to form a foam finger 52. The longitudinal cut lines 87 and the first vertical cut lines 93 define the first and second slits 64,66 in the ends of the foam fingers 52. The second vertical cut lines 94 define the edges of the fingers.

Figure 15:
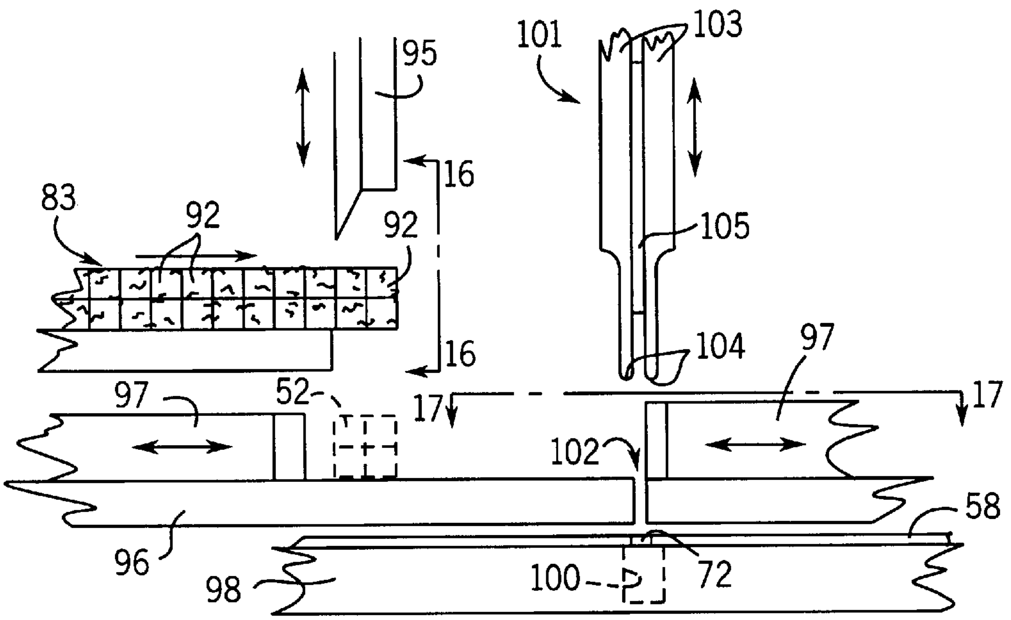
FIG. 15 is a generally schematic side elevation showing the separation of the foam members from the continuous strip and their attachment to the support substrate.
Figure 16:
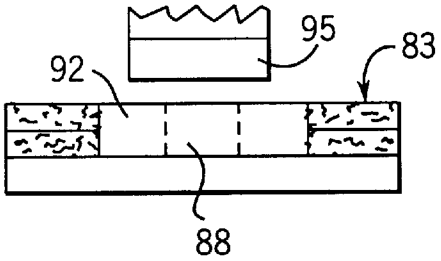
FIG. 16 is an end elevation taken on line 16—16 of FIG. 15.
Figure 17:
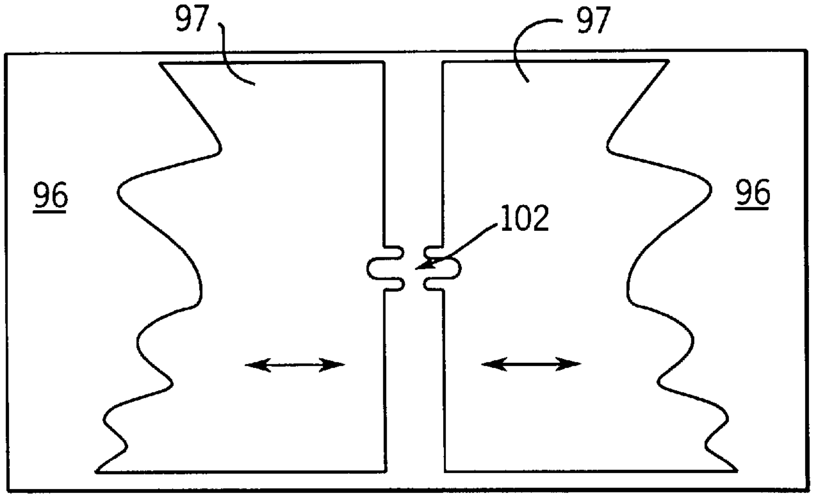
FIG. 17 is a top plan view of the apparatus of FIG. 15 taken on line 17—17 thereof.

The tips of the foam members 92 may be optionally treated to provide an abrasive surface, as will be described hereinafter with respect to FIGS. 21 and 22. However, if the foam members are not so treated, the strip continues to advance into the apparatus for attaching the fingers 52 to the support substrate 58 as shown in FIGS. 15–17. Referring first to FIG. 15, as the foam strip 83 is indexed longitudinally for operation of the vertical cutting knives 90 and 91, a vertical cutoff knife 95 is positioned over the advancing lead end of the strip to separate one foam member 92 to provide a foam finger 52. As may be seen in FIG. 16, the vertical cutoff knife 95 need only have a blade length sufficient to severe the center connecting portion 88 of the foam member 92.

Referring also to FIG. 17, the foam finger 52, severed from the advancing foam strip 83, drops onto an upper table 96 and between a pair of reciprocating slide plates 97, one of which moves the foam finger 52 horizontally over the upper table 96 and, in operation with the other slide plate, positions the finger over the support substrate 58 and compresses it slightly prior to insertion vertically downwardly and into the opening 72 in the substrate. The substrate 58, in which the openings 72 have been preformed in this embodiment, is supported on a lower table 98 which is provided with a recess 100 for receipt of the lower end of a stuffing tool 101. The stuffing tool 101 operates reciprocally between the opposing edges of the slide plates 97 and through a tool guide 102 cooperatively formed by the slide plates as they close on the foam finger 52.

The stuffing tool 101 includes a pair of jaws 103 which are fixed in position relative to one another and which move vertically in unison to push the foam finger downwardly from between the slide plates 97 to the upper surface of the underlying support substrate 58. On their downward stroke, the jaws 103 stop with the lower jaw tips 104 holding the foam finger against the upper surface of the support substrate 58. Then an independently reciprocal punch 105, slidably mounted between the jaws 103, is caused to move downwardly and force the center portion of the finger 52 through the opening 72 in the substrate. The center portion comprises the folded portion 70 of the finger as discussed above. As the foam strip 83 is indexed toward the cutoff knife and the next finger 52 positioned for insertion, the support substrate 58 is also suitably indexed to provide another opening 72 under the stuffing tool 101.

Figure 19:
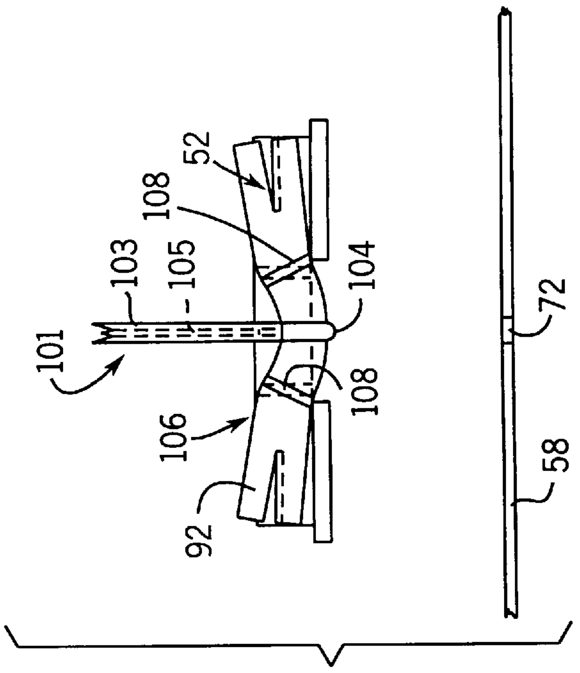
FIG. 19 is a schematic end elevation view of a combined separating and stuffing tool for the form members.
Figure 18:
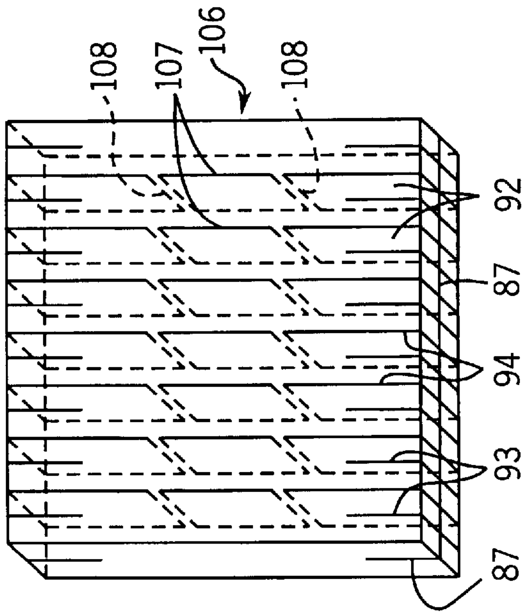
FIG. 18 is a perspective view of a polymeric foam strip showing an alternate slitting and cutting pattern to form the individual foam members.
Figure 20:
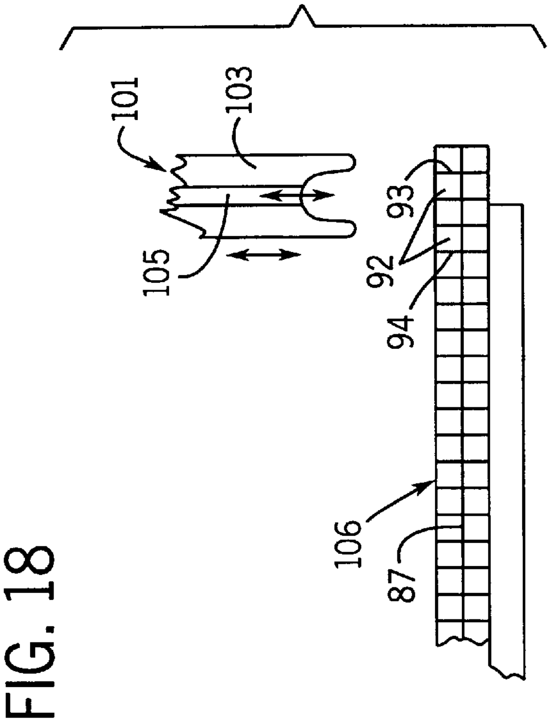
FIG. 20 is a schematic side elevation of FIG. 19.

FIGS. 18–20 show schematically an alternate embodiment of the foam strip and means for simultaneously separating the foam member from the lead end of the strip and attaching it to the substrate 58 with a stuffing tool 101. The modified foam strip 106, as shown in FIG. 18, is provided with the same longitudinal cut lines 87 and first and second vertical cut lines 93 and 94 as previously described foam strip 83. However, an additional vertical cut 107 is made in the center portion of the strip and coplanar with the second vertical cut lines 94. However, the additional vertical cut leaves a pair of spaced connecting lines 108 to retain the modified foam member 110 united to the foam strip until it is in a position to be separated and stuffed into the substrate. In this arrangement, the stuffing tool 101 is located in the position of the vertical cut-off knife 95 of the FIG. 15 embodiment and, as a substitute for cutoff, it tears the foam finger from the lead end of the strip and simultaneously moves it downwardly to the substrate 58 wherein the punch 105 forces the center portion of the foam finger through the opening 72 in the substrate, as previously described.

Figure 22:
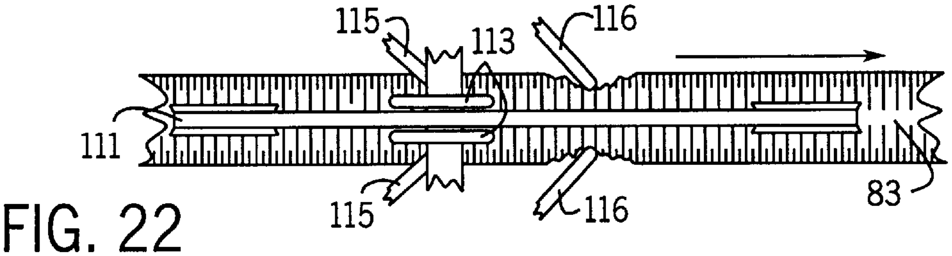
FIG. 22 is a top plan view of FIG. 21.
Figure 21:
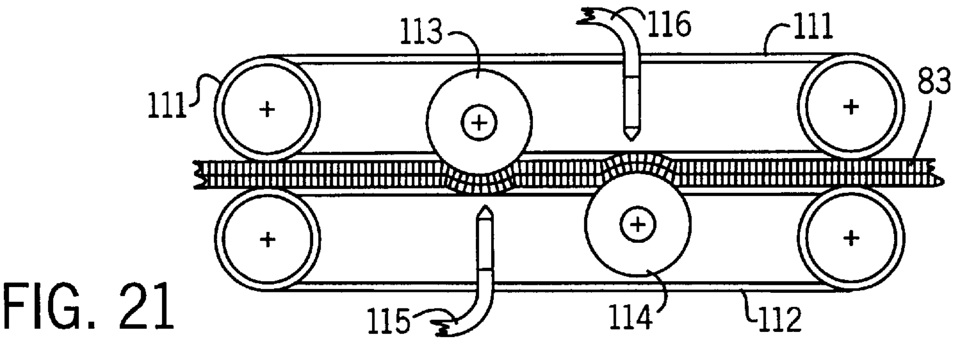
FIG. 21 is a schematic side elevation view of an apparatus for applying abrasive particles to the foam members on the continuous foam strip.

Referring now to FIGS. 21 and 22, the apparatus shown schematically therein may be utilized to coat the tips of the foam fingers with fine abrasive particles to provide a pad with different finishing characteristics. The apparatus shown in FIGS. 21 and 22 may be positioned immediately downstream of the apparatus shown, respectively, in FIGS. 13 and 14 to coat the tips of the fingers immediately after they have been formed by the various cutting knives 86, 90 and 91. The pre-slit foam strip 83 is conveyed forwardly and held in a horizontal orientation between upper and lower conveyor belts 111 and 112. As with the indexing belts 85, the conveyor belts 111 and 112 hold the strip along the center thereof and along the regions of the uncut connecting portions 88 of the foam members 92. A pair of upper displacement rollers 113 is positioned between the upper and lower runs of the upper conveyor belt 111 such that the rollers straddle the lower run of the belt and force the slit lateral ends of the foam members downwardly. This action causes the slit tips of the fingers on the underside of the foam strip to be spread apart and opened. Immediately below the upper displacement rollers 113 is a pair of lower spray nozzles 115 which apply a mixture of a liquid adhesive and a solid abrasive particles to the exposed tips of the foam fingers.

The lower displacement rollers 114, positioned immediately downstream, straddle the upper run of the lower conveyor belt 112 and are positioned to displace the foam strip upwardly to spread and open the slit finger tips on the upper face of the foam strip 83. An upper spray nozzle 116 applies the adhesive/abrasive mixture to the exposed tips of the fingers. From the downstream end of the conveyor belts 111 and 112, the foam strip may be processed through the vertical cut-off knife 95 and stuffing apparatus as previously described.

Abrasive particles may be applied to the foam finger tips in other ways. For example, abrasive particles may be incorporated directly into the foam as a part of the foaming process. It may be desirable in the manufacture of pads of string-like construction of the present invention, particularly those including abrasive particles, to attach the foam fingers to the substrate in a less dense array than in finishing pads utilizing plain foam fingers. A less dense construction of the finishing pads allows greater exposure of the abrasive finger tips to the surface being operated upon.

Various alternatives and embodiments are contemplated as being within the scope of the following claims particularly pointing out and distinctly claiming the subject matter regarded as the invention.

We claim:

1. A method of making a surface finishing pad comprising the steps of:

(1) providing a continous strip of polymeric foam material having planar top and bottom surfaces extending between two narrower opposite lateral edges;

(2) partially cutting the continous strip inwardly from the lateral edges to provide a longitudinally extending row of laterally elongate foam members, each of the members having opposite end tips between an uncut attachment portion;

(3) separating individual elongate foam members from the strip; and, (4) pushing the attachment portion of each foam member through a support member having a front face and a rear face such that the attachment portion extends from the rear face and the foam member is divided into two fingers extending from the front face, with the end tips defining a pad finishing face.

2. The method as set forth in claim 1 comprising the additional steps of:

(1) cutting the strup of foam horizontally along said opposite lateral edges between the top and bottom surfaces; and (2) cutting each end tip on the strip vertically;

3. The method as set forth in claim 1 including the steps of:

(1) displacing the fingers from the planes of the representative planar top and bottom surfaces of the foam strip to expose the end tips; and, (2) applying a mixture of abrasive particles and liquid adhesives to the exposed end tips.

4. The method as set forth in claim 3 wherein the step of applying comprises spraying said mixture.

5. The method as set forth in claim 3 wherein the step of applying comprises spraying said mixture.

6. The method as set forth in claim 1 wherein the cutting step comprises slitting the strip inwardly from said opposite lateral edges and leaving a narrow center connecting portion.

7. The method as set forth in claim 6 wherein the separating step comprises serially cutting the connection portion of the foam member from the strip.

8. A method of manufacturing a surface finishing pad comprising the steps of:

(1) providing a continous strip of polymeric foam having parallel planar top and bottom surfaces extending between narrower opposite lateral edges;

(2) separating individual elongate foam members successively from a leading end of the strip, each of the members having opposite end tips;

(3) providing a supporting substrate having generally planar front and rear faces and a selected pattern of openings formed therethrough;

(4) folding each of the foam members to form an attachment portion between the end tips and to divide each of the members into first and second foam fingers; and (5) pushing the attachment portion of each foam member through an opening in the substrate such that the attachment portion extends from the rear face of the substrate and the first and second foam fingers extend from the front face of the substrate with the end tips defining a pad finishing face.

9. The method as set forth in claim 8 including before, the separating, the step of applying a mixture of abrasive particles and a liquid adhesive to the end tips.

10. A method of manufacturing a surface finishing pad comprising the steps of:

providing a support substrate having a front face and a back face;

separating individual foam members from a strip of polymeric foam material, each foam member having a first outer tip and a second outer tip;

folding each of the foam members to form an attachment portion between the first and second outer tips, such that each foam member defines a first foam finger extending from the attachment portion to the first outer tip and a second foam finger extending from the attachment portion to the first outer tip and a second foam finger extending from the attachment portion to the second outer tip; and pushing the attachment portions of a plurality of said foam members through the support substrate such that the attachment portion of each foam member extends from the back face of the support substrate, wherein the foam fingers extend in array from the front face of the support substrate such that the outer tips define a pad finishing surface.

11. The method of claim 10 further comprising the step of forming a plurality of openings in the support substrate, each opening receiving the attachment portion of one of the foam members.

12. The method of claim 10 further comprising the steps of slitting the outer tip of each foam finger such that the outer tip of each foam finger includes a plurality of contact tips.

13. The method of claim 10 further comprising the steps of attaching abrasive particles to the outer tips of each foam member.

14. A method of manufacturing a surface finishing pad comprising the steps of:

providing a support substrate having a front face and a back face;

forming a plurality of individual foam members each having a first outer tip and a second outer tip;

folding each of the foam members to form an attachment portion between the first and second outer ends, such that each foam member defines a first foam finger extending from the attachment portion of the first outer tip a second foam finger extending from the attachment portion to the second outer tip; and, pushing the attachment portion of each foam member through the support substrate such that the attachment portion of each foam member extends from the back face of the support substrate, wherein each of the foam fingers extends from the front face of the support substrate such that the outer tips define a pad finishing surface.

15. The method of claim 14 including the step of arranging the foam members in a dense array along the support substrate.

16. The method of claim 14 further comprising the step of forming a plurality of openings in the support substrate, each opening receiving the attachment portion of one of the foam members.

* * * * *

UNITED STATES PATENT AND TRADEMARK OFFICE

CERTIFICATE OF CORRECTION

PATENT NO. : 6,312,485 B1
DATED : November 6, 2001
INVENTOR(S) : Richard A. Kaiser et al.

It is certified that error appears in the above-identified patent and that said Letters Patent is hereby corrected as shown below:

<u>Column 11,</u>
Line 55, "vertically;" add new paragraph -- whereby each of the fingers includes four end tips. --
Line 66, delete "spraying said mixture" and substitute therefore -- dipping the end tips in a bath of said mixture --.

<u>Column 12,</u>
Line 42, delete "first" and substitute therefor -- second --;
Lines 42-44, delete "and a second foam finger extending from the attachment portion to the second outer tip".

Signed and Sealed this

Seventh Day of May, 2002

*Attest:*

JAMES E. ROGAN

*Attesting Officer*

*Director of the United States Patent and Trademark Office*